United States Patent [19]

Mycynek

[11] 4,377,823
[45] Mar. 22, 1983

[54] NOISE PROCESSING SYSTEM FOR A TELEVISION RECEIVER

[75] Inventor: Victor G. Mycynek, Des Plaines, Ill.

[73] Assignee: Zenith Radio Corporation, Glenview, Ill.

[21] Appl. No.: 249,793

[22] Filed: Apr. 1, 1981

[51] Int. Cl.³ .................... H04N 5/08; H04N 5/21
[52] U.S. Cl. ................................ 358/157; 358/167
[58] Field of Search ............. 358/157, 167, 177, 213, 358/36, 163

[56] References Cited

U.S. PATENT DOCUMENTS 2,852,602  9/1958  Foster .................................. 358/157
3,878,325  4/1975  Cecchin et al. ...................... 358/167

Primary Examiner—John C. Martin

[57] ABSTRACT

A noise processing system is described for use in protecting a television receiver's sync processing path and its video processing path from impulse noise. To protect the video processing path, a first noise canceller receives a composite video signal, detects each noise pulse therein which exceeds a video noise threshold, and replaces each such noise pulse with a selected voltage level. The resultant noise processed video may then be applied to the receiver's video processing path. To protect the sync processing path, another noise canceller receives the composite video signal, detects noise pulses therein which exceed a sync noise threshold, generates a detection pulse for each such noise pulse, and combines the detection pulses with composite video so as to cancel the noise pulses. Thus, another noise processed video signal is developed for application to the receiver's sync processing path.

10 Claims, 9 Drawing Figures

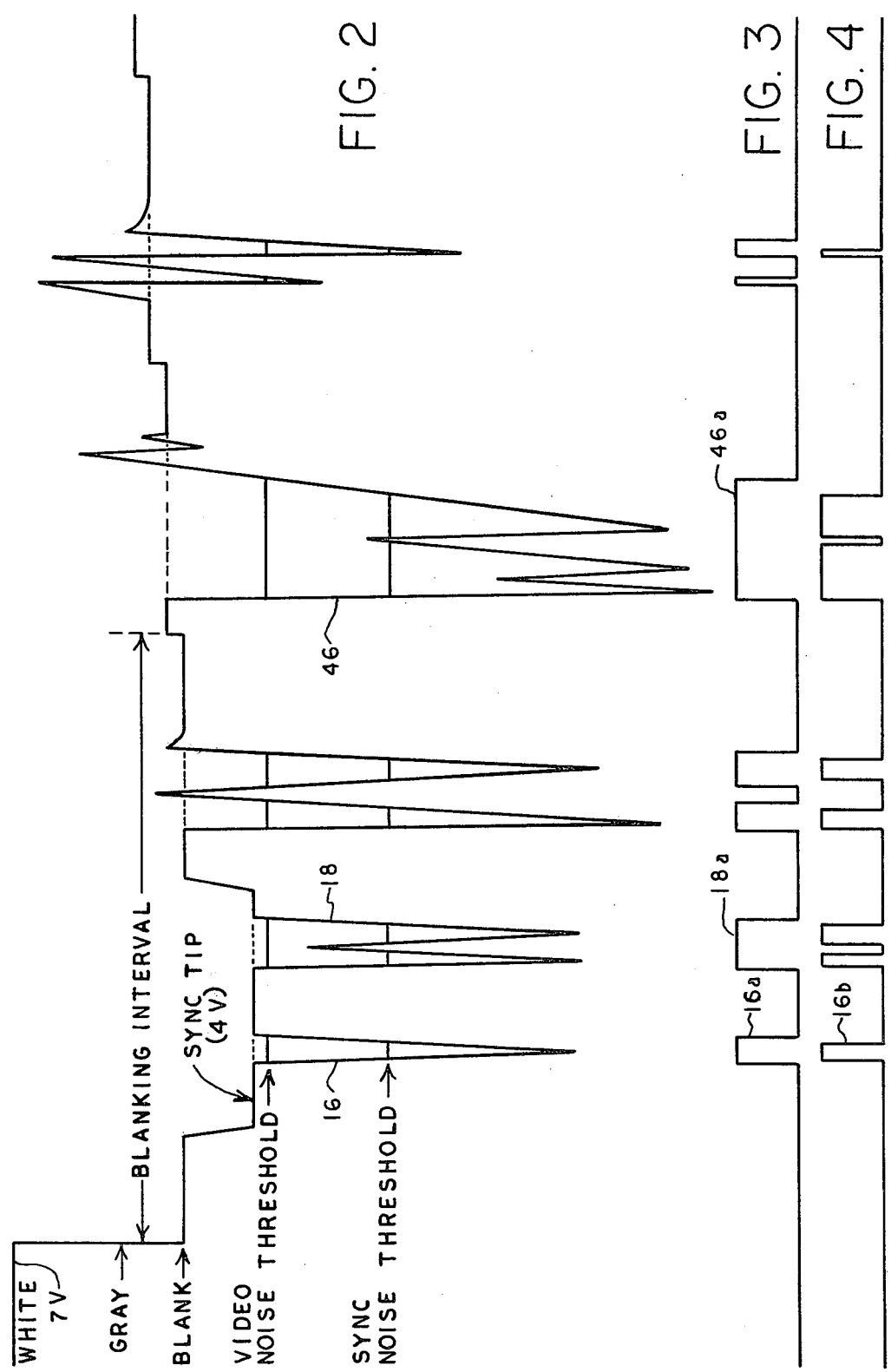

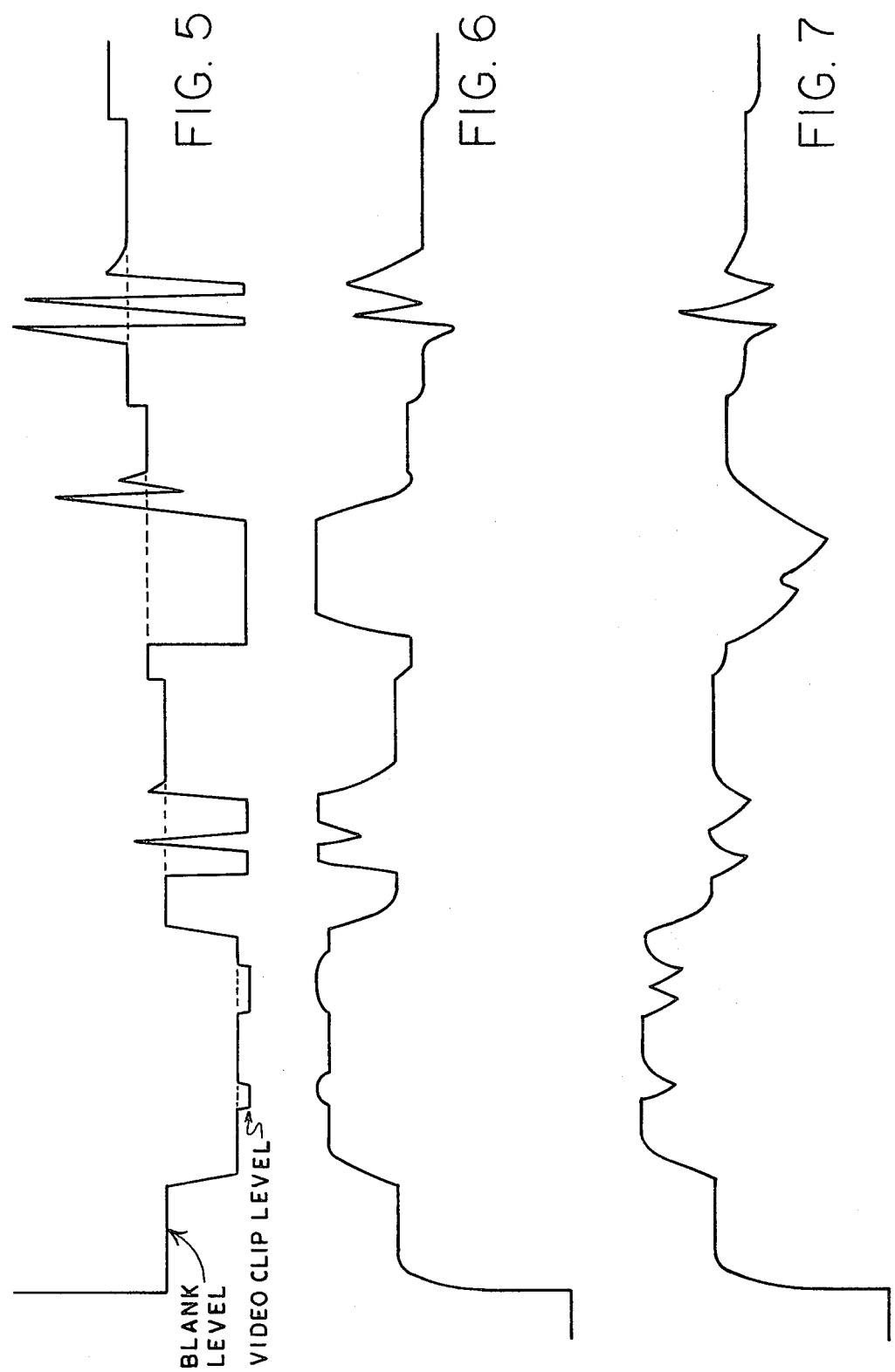

NOISE PROCESSING SYSTEM FOR A
TELEVISION RECEIVER

BACKGROUND OF THE INVENTION

This invention is generally directed to improvements in television receivers. It is specifically directed to an improved noise processing system for use in such a receiver.

Television receivers typically include a video detector for developing a composite video signal which includes video information and sync information. The former information is coupled to a video processing path which amplifies and otherwise pre-conditions the video information for input to a cathode ray tube. The sync information is extracted from the composite video signal by coupling the detector's output to a sync processing path which normally includes a sync separator. The latter device develops horizontal and vertical sync output pulses from the composite video signal.

In the case where impulse noise is present in the detector's output, that noise may be coupled into the video processing path and result in a noisy image being developed on the screen of the cathode ray tube. The impulse noise will also be coupled into the sync processing path and cause the sync separator to generate unwanted outputs. Because the output of the sync separator is usually coupled to an AGC (automatic gain control) system in the receiver, the latter system may be disrupted by the noise-induced output of the sync separator.

To avoid AGC disruption by impulse noise, many receivers include some form of noise protection, as shown in U.S. Pat. No. 3,806,646, for example. Although prior noise protection circuits have provided improved AGC performance under noisy conditions, even better protection is desired, particularly for receivers which use envelope detectors. Such detectors tend to rectify white-going noise impulses and develop higher energy black-going noise impulses. The latter impulses have a particularly deleterious effect on the receiver's AGC system and sync separator, causing the displayed television image to suffer from broad area brightness fluctuations, small area brightness and color distortions, and horizontal and vertical jitter.

Accordingly, it is a general object of the invention to provide an improved noise processing system for a television receiver.

It is a more specific object of the invention to provide a noise processing system which protects the receiver's video processing path as well as its sync processing path from impulse noise.

It is another object of the invention to provide such a noise processing system which gives a high level of noise protection to the sync and video processing paths in the presence of high energy, black-going noise impulses of the type output by envelope detectors.

BRIEF DESCRIPTION OF THE DRAWINGS

The objects stated above and other objects of the invention are set forth more particularly in the following detailed description and in the accompanying drawings, of which:

FIG. 2 illustrates a portion of a composite video signal having impulse noise, which signal is illustrative of the output of the detector shown in FIG. 1;

FIG. 3 depicts the output of one of the impulse detectors of FIG. 1;

FIG. 4 depicts the output of the other impulse detector shown in FIG. 1;

FIG. 5 shows the output of the video clipper of FIG. 1;

FIG. 6 depicts an integrated composite video signal developed by the integrator and inverter of FIG. 1;

FIG. 7 illustrates the output of the miller integrator and inverter which is applied to the sync separator of FIG. 1.

DESCRIPTION OF THE PREFERRED
EMBODIMENT

Figure 1:
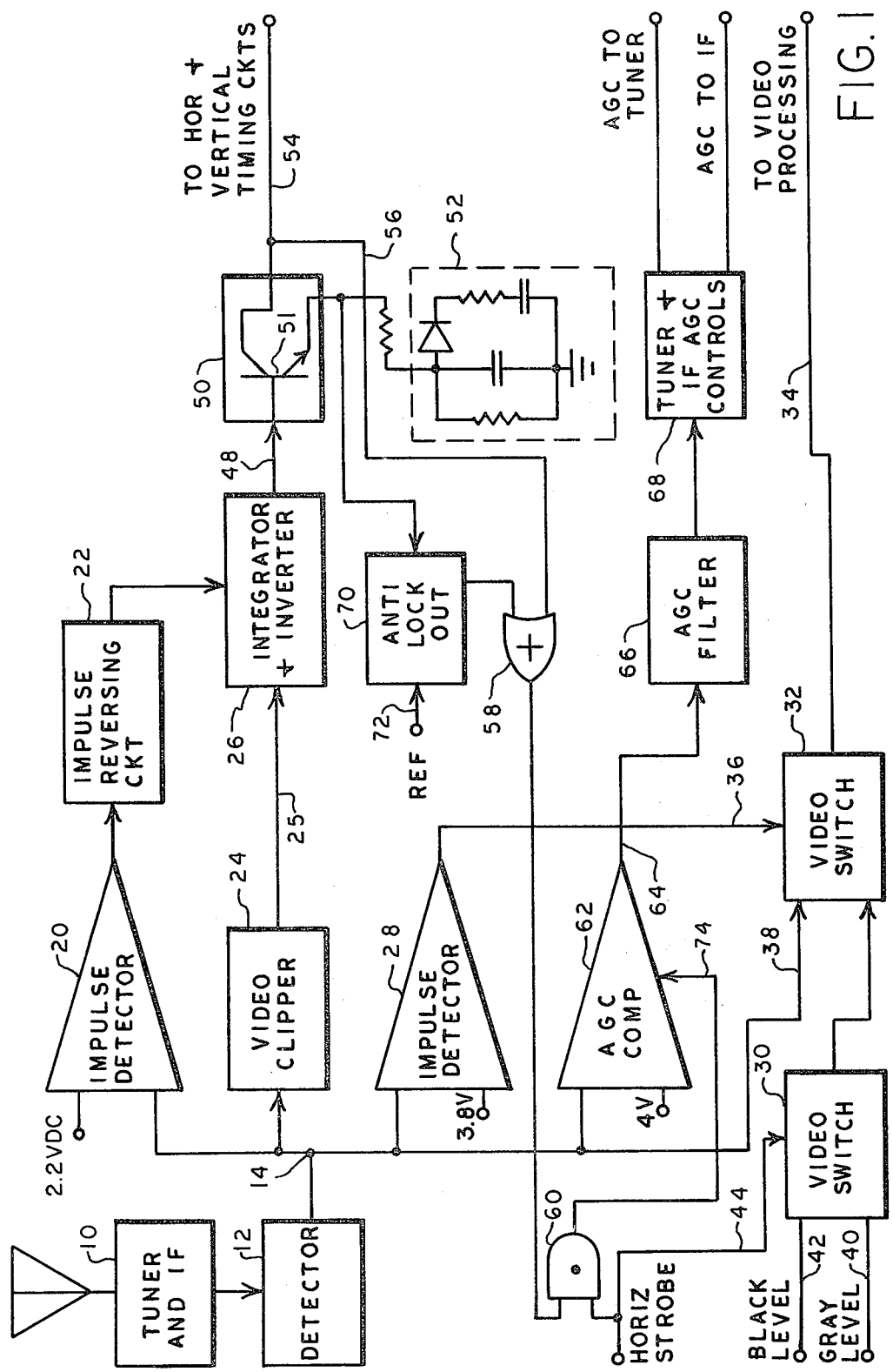
FIG. 1 is a block diagram of the noise processing system according to the invention.

Referring now to FIG. 1, a noise processing system is shown for reducing the effect of impulse noise on a television receiver's sync processing path as well as on its video processing path. The receiver typically includes a tuner and IF stage 10 for receiving and amplifying an incoming television signal. The output of the stage 10 is typically coupled to the input of a detector 12 for demodulating the received television signal. The output of the detector 12 is a composite video signal which includes sync components and video components at the node 14.

The composite signal present at the node 14 will sometimes include noise impulses which are both white-going and black-going in the case where the detector 12 is a synchronous type detector. In the case where an envelope detector is used, the impulse noise at the node 14 will largely be black-going noise, i.e., noise impulses which extend toward and beyond sync tips.

Referring briefly to FIG. 2, an illustrative waveform of a portion of a composite signal is shown of the type which is developed at node 14 under noisy signal conditions. The illustrated waveform is shown as having a white level, a gray level, and a blank level. Extending downwardly from the blank level is a sync tip on which a pair of noise impulses 16 and 18 are superimposed. In the illustrated waveform, the noise pulses 16 and 18 are of the black-going type which are typically generated by an envelope detector. It is this type of noise pulse which the present system substantially removes in order to prevent disruption of the receiver's AGC system, to minimize disturbance of the horizontal and vertical deflection system via the sync separator output, and to improve the quality of the video image which the receiver develops from the composite video signal.

Referring again to FIG. 1, that portion of the noise processing system which protects the receiver's sync processing path from impulse noise includes an impulse detector 20, an impulse reversing circuit 22, a video clipper 24 and an integrator and inverter 26. The latter four devices operate to remove the noise pulses 16 and 18 (FIG. 2) from the composite signal present at node 14, so that the output of the integrator and inverter 26 constitutes a video signal from which noise pulses have been removed.

To protect the receiver's video processing path from impulse noise, the illustrated system includes another impulse detector 28 and a pair of video switches 30 and 32. The latter three devices generally operate to sense the noise pulses present at the node 14 and to insert into the video signal a selected voltage level in place of the noise pulses so as to develop at output lead 34 a noise processed video signal in which noise pulses have been replaced with a voltage level which is selected to minimize distortion in the video image which is developed from the signal on the lead 34. The way in which noise pulses are removed from the video signal for protection of the video processing path is described immediately below. Thereafter, the noise processing which protects the sync processing path will be described in greater detail.

Referring first to the impulse detector 28, this device receives the composite video signal from the node 14 and also a reference voltage indicated as 3.8 volts. The detector 28 senses noise pulses which extend beyond, that is, more negative than, 3.8 volts and generates a control signal upon the occurrence of each such detection. Referring again to FIG. 2, the 3.8 volt reference which is applied to the impulse detector corresponds to the video noise threshold shown in FIG. 2. In the present embodiment, a video noise threshold of 3.8 volts is selected for the case in which the composite video signal at node 14 has a white level of about 7 volts and a sync tip level of about 4 volts. Those white and sync tip levels may, of course, have other values. Nevertheless, the video noise threshold is consistently selected to be at or somewhat below the sync tip level as shown in FIG. 2.

Whenever the noise pulses at the node 14 extend lower than the video noise threshold, the impulse detector 28 generates a control signal which may be in the form of a control pulse. For example, FIG. 3 shows a control pulse 16a which is generated by the impulse detector 28 in response to the pulse 16 extending beyond the video noise threshold. Likewise, another control pulse 18a is developed in response to the noise pulse 18. As shown, additional control pulses are developed in response to each noise pulse which extends beyond the video noise threshold. These control pulses are coupled via a lead 36 (FIG. 1) to the video switch 32 to activate the latter device in response to each control pulse.

The video switch 32 also receives the composite video signal via an input lead 38. In response to each control pulse on the lead 36, the switch 32 operates to delete a time coincident noise pulse received on the lead 38 and to replace the deleted noise pulse with a voltage level selected to minimize disruption of the video image.

The voltage level which the switch 32 uses as a replacement for noise pulses is derived from the video switch 30. The switch 30 receives a gray level voltage at an input lead 40, a blank level voltage at an input lead 42, and a horizontal strobe at another input lead 44. During the active scan time of the receiver, the switch 30 preferably operates to couple the gray level signal on lead 40 to the video switch 32 so that, whenever a control pulse is present on the lead 36, the switch 32 replaces noise pulses in the lead 38 with a gray level signal received from the video switch 30.

Referring again to FIG. 2, the gray level signal is selected to be more negative than the video signal's white level and more positive than its blank level. Preferably, the gray level signal is selected to be approximately 30 IRE units.

As stated previously, it is preferred that the gray level signal be inserted into the video signal only during the receiver's active scan time. For example, FIG. 2 illustrates a noise pulse 46 which occurs during the receiver's active scan time. When this noise pulse occurs, the impulse detector 28 develops a control pulse 46a which causes the video switch 32 to delete the noise pulse 46 from its received video signal and to substitute in its place the gray level signal received from the video switch 30. During the receiver's blanking interval, it is preferred not to insert the gray level signal because DC restoration circuitry (not shown) in the receiver normally senses the blank level for restoring the video signal to a selected DC level. Thus, it is preferred that the noise pulses 16 and 18 which occur during the blanking interval not be replaced by a gray level signal. In the present embodiment, the noise pulses 16 and 18 are removed by the video switch 32 and replaced by a blank level signal so as not to upset the DC restoration circuitry.

Referring again to FIG. 1, the horizontal strobe which is received by the video switch 30 via the lead 44 may be derived from the receiver's flyback pulse so as to inform the switch 30 that the receiver is in the blanking interval. When the horizontal strobe is received, the switch 30 outputs to the switch 32 the blank level signal received via the lead 42 rather than the gray level signal received on the lead 40. Hence, the switch 32 replaces impulse noises with a blank level signal whenever the receiver is in the blanking interval. Thus, the signal on the lead 34 constitutes a video signal from which noise pulses have been removed and replaced, during the blanking interval, by a blank level signal and, during the receiver's active scan time, by a gray level signal.

Returning now to a discussion of that portion of the noise processing system which protects the sync processing path from impulse noise, the impulse detector 20 senses impulse noise which extends beyond the video threshold level and beyond a second threshold level which exceeds the video threshold level. As shown in FIG. 1, a sync noise threshold is established by inputting to the detector 20 a 2.2 volt DC reference signal which corresponds to the sync noise threshold shown in FIG. 2.

In response to each noise pulse which extends beyond the sync noise threshold (2.2 volts), the detector 20 generates a detection pulse for application to the impulse reversing circuit 22. For example, FIG. 4 illustrates a detection pulse 16b which the impulse detector 20 generates in response to the noise pulse 16. As shown, the detector 20 generates similar detection pulses for every other noise pulse which extends below the sync noise threshold.

Referring again to FIG. 1, the detection pulses generated by the impulse detector 20 are coupled to the impulse reversing circuit 22. The latter circuit is a non-saturating, fast operating circuit which reverses the polarity of each of the pulses received from the detector 20 and applies those inverted pulses to the integrator and inverter 26.

The video clipper 24 receives the composite video signal from node 14 and operates to clip off all noise pulses which extend just below the sync tip level. FIG. 5 illustrates the output of the video clipper, indicating that each of the noise pulses shown in FIG. 2 have been clipped off at a level just below the sync tip level.

The clipped video signal from the video clipper 24 is applied via a lead 25 to the input of the integrator and inverter 26. One function of the latter device is to integrate and invert the signal received from the video clipper 24 to insure that clipped noise pulses received as part of the signal from the clipper 24 are time coincident with corresponding detection pulses received from the impulse reversing circuit 22. FIG. 6 illustrates the video signal which has been integrated and inverted by the device 26.

Another function of the device 26 is to combine the clipped video signal with the detection pulses so as to cancel the clipped noise pulses wherever they occur in the video signal. FIG. 7 illustrates the video signal which appears at the output of the device 26 (lead 48). As shown, each detection pulse causes a noise cancelling effect in the signal at the lead 48, thereby generating a noise processed video signal which may be applied to the receiver's sync processing path without disrupting the normal sync separation and AGC functions usually associated with such a path.

The first illustrated element in the sync processing path is a sync separator 50. As shown, the separator 50 includes a transistor 51 which receives the noise processed video information at its base via the lead 48 and which includes a resistance-capacitance network 52 in its emitter circuit. The network 52 is conventional and is employed to permit the transistor 51 to efficiently develop horizontal and vertical sync pulses at its output lead 54. The latter lead is conventionally coupled to horizontal and vertical timing circuits (not shown) for use in synchronizing the receiver's vertical and horizontal scan rates with the incoming television signal. Because large amplitude noise pulses are removed from the input to the sync separator, its output is also substantially free of noise-induced pulses. Consequently, the circuitry which receives the output of the sync separator operates more reliably under noisy signal conditions.

In the special case of severe and prolonged impulse noise conditions, the input to the sync separator may be held low for a prolonged period of time. Consequently, the sync separator may not develop an output for a prolonged period of time, but AGC action must be restored to prevent a lockout situation. This is the function of an anti-lockout circuit 70 which is described later.

Under noise conditions which exist for relatively short periods of time, the absence of an output from the sync separator is beneficial because the receiver's AGC holds the amplitude of the video signal to its previously established level and normal operation is reached in a non-disruptive way.

The sync pulses at the lead 54 are also coupled via another lead 56 to one input of an OR gate 58, the output of which is coupled to one input of an AND gate 60. The other input gate 60 is a horizontal strobe so that the gate 60 develops an output pulse each time it receives a horizontal strobe in time coincidence with a sync output pulse from the sync separator 50.

An AGC comparator 62 receives the pulse outputs from the gate 60, the composite video signal from the node 14, and a four volt reference voltage. Each time the gate 60 develops an output pulse, the comparator 62 compares the sync tip levels in the composite video signal with the four volt reference voltage and develops an output at lead 64 indicative of any difference between the four volt reference level and the sync tip level.

An AGC filter 66 receives the signal on the lead 64 for storing a voltage indicative of the difference between the sync tip levels and the four volt reference applied to the AGC comparator 62. The voltage stored in the filter 66 is applied to tuner and IF (intermediate frequency) AGC controls 68. These controls respond to the AGC voltage received from the filter 66 for coupling further AGC signals to the receiver's tuner and to its IF amplifier to control the gain of both the tuner and the IF amplifier so that sync tip levels output from the detector 12 are maintained at the four volt reference level.

Referring again to the AGC comparator 62, it will be understood that the comparator cannot function properly if the sync separator 50 does not develop output pulses at the lead 56. Thus, when a composite video signal is not present at the node 14 for some interval, the sync separator 50 will develop no output pulse and the AGC comparator 62 will temporarily cease to function properly. The same effect occurs when the composite video signal at node 14 rises to a very large level. To overcome this so-called lockout problem, it is conventional to sense the voltage on the capacitors in the network 52 to determine if such a lockout condition has arisen. Normally, the capacitors in the network 52 will discharge when the transistor 51 has not developed output pulses for a predetermined interval. In the illustrated arrangement, the anti-lockout network 70 is coupled to the emitter of the transistor 51 for sensing when the voltage on the capacitors in the network 52 drops to a predetermined low level. A reference voltage is also coupled to the network 70 via a lead 72 so that when the voltage on the capacitors in network 52 falls below the reference voltage on the lead 72, the network 70 develops an output which is coupled to the OR gate 58 via a lead 74 for actuating the AND gate 60 when the next horizontal strobe is received. In this manner, the AGC comparator is actuated in order to modify the AGC voltage in the filter 66, thereby to adjust the gain of the tuner and/or the IF amplifier so that a composite video signal is developed at node 14 of the proper amplitude.

Figure 8:
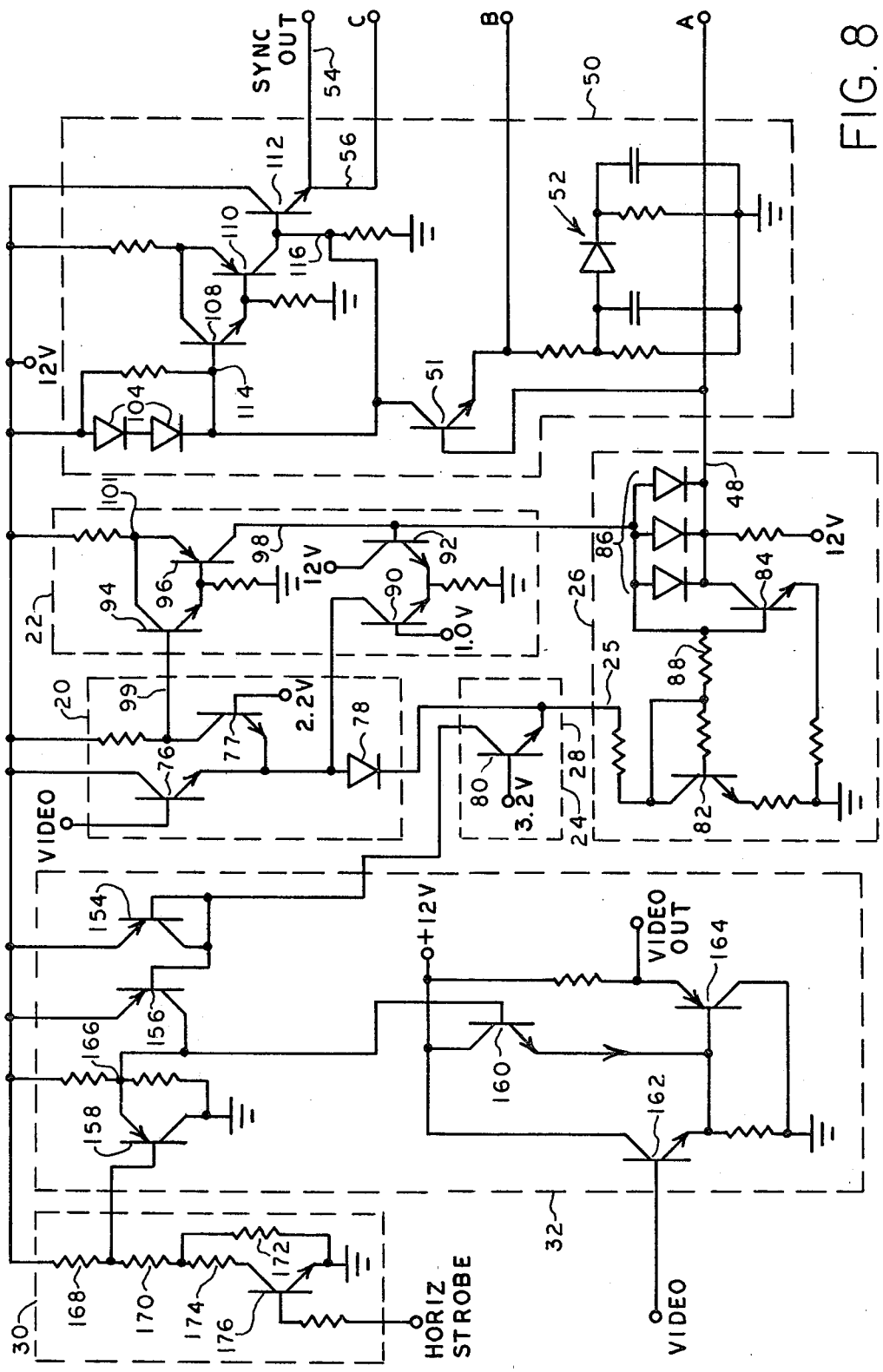
FIGS. 8 and 9 constitute a detailed circuit diagram of a preferred embodiment of the noise processing system shown in FIG. 1.
Figure 9:
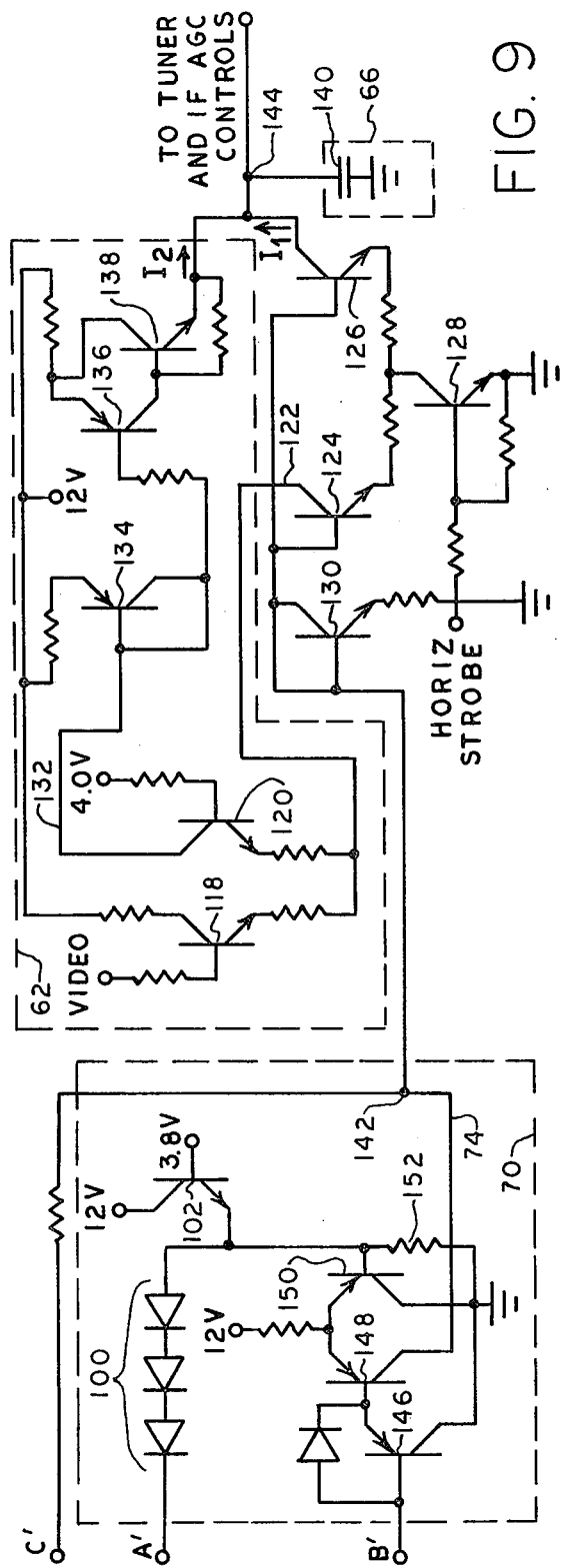

Referring now to FIGS. 8 and 9, a detail circuit diagram is shown of the noise processing system of FIG. 1 and various conventional components shown in FIG. 1, such as the anti-lockout circuit 70. In these Figures, dashed lines enclose circuit components which perform the functions of the elements shown in FIG. 1. However, some of the circuit components in FIGS. 8 and 9 have dual or overlapping functions, wherefore, the correspondence between the functional blocks of FIG. 1 and the dashed line blocks of FIG. 8 is not exact.

To illustrate the interconnections between FIGS. 8 and 9, FIG. 8 includes three output leads indicated as A, B and C, which are inputs to leads A', B' and C', respectively, of FIG. 9.

Referring first to the impulse detector 20 shown in FIG. 8, that detector includes transistors 76 and 77 and a diode 78. The base of the transistor 76 receives a composite video signal from the detector 12 of FIG. 1 and couples the video signal through the diode 78 to the lead 25, the latter of which corresponds to the output of the video clipper 24 of FIG. 1. When the video signal at the emitter of transistor 76 includes no noise pulses which extend below the sync noise threshold, the transistor 77 is held off by a 2.2 volt bias on its base.

The functions of the video clipper 24 and the impulse detector 28 of FIG. 1 are provided by a transistor 80 whose emitter is coupled to the lead 25. When the composite video signal includes no noise pulses which exceed the video noise threshold, the transistor 80 remains off and the lead 25 carries an unmodified composite video signal.

Coupled to the lead 25 is the integrator and inverter 26 which includes transistors 82 and 84 and diodes 86. The transistors 82 and 84 are interconnected as an amplifying and inverting current mirror. Hence, the composite video signal on lead 25 is amplified and inverted at the collector of the transistor 84 (lead 48) such that sync tips on the lead 48 now extend in a positive direction.

Integration of the video signal on the lead 48 is effected by the capacity associated with the diodes 86, a resistor 88 which is coupled to the base of the transistor 84, the collector to base capacity of the transistor 84, and the amplification associated with that transistor. The amplified, inverted and integrated video signal on the lead 48 is coupled to the sync separator 50 and, via the lead A, to the anti-lockout circuit 70 (FIG. 9).

Assuming now that the input at the base of the transistor 76 includes a noise pulse which extends below the video noise threshold (3.8 volts), that noise pulse will cause the diode 78 to turn off and the transistor 80 to turn on because its base receives a bias of 3.2 volts. Hence, the transistor 80 clamps the lead 25 so that the noise pulse present thereon can extend no lower than the video noise threshold, as shown in FIG. 5. Consequently, the integrator and inverter 26 develops at its lead 48 a waveform such as that shown in FIG. 6 when the noise pulses are clipped by the transistor 80.

To sense the presence of the noise pulse which extended below the sync noise threshold, the transistor 77 receives a voltage of 2.2 volts at its base. When such a noise pulse occurs, the transistor 77 turns on and receives the current which would ordinarily maintain the transistor 76 in an on condition. That current is supplied by a transistor 90 which is interconnected with another transistor 92 as a differential amplifier. Thus, when the transistor 77 turns on, all of the current supplied by the transistor 90 is received by the transistor 77.

Coupled to the collector of the transistor 77 is a load resistor and the input to the circuit comprised of transistors 94 and 96. When transistor 77 turns on sufficiently hard, transistor 96 turns on so that its collector (lead 98) carries a substantial amount of current. As shown, the lead 98 is coupled to the base of the transistor 84, wherefore the high level of current in the lead 98 causes the transistor 84 to conduct harder so that its collector voltage (lead 48) drops rapidly. Thus, a noise pulse which extended below the sync noise threshold turns on the transistor 77 in the above sequence of events in order to lower the voltage at lead 48 and thereby cancel out the noise pulse at that point. This effect is illustrated in FIG. 7.

For high speed noise processing operation, it is undesirable that the transistor 84 ever go into saturation. For this purpose, the collector of the transistor 84 is coupled via the leads A and A' (FIG. 9) to diodes 100 and the emitter of the transistor 102 so as to clamp the collector voltage of the transistor 84 to a predetermined low level beyond which it cannot descend.

Another factor which influences the speed with which the noise processing can occur is the rate at which the voltage on the lead 98 can recover to a nominal value from the initial high level it experienced when the transistor 96 was turned on. To cause that voltage to be lowered rapidly, the base of the transistor 92 is connected to the lead 98 and the base of the transistor 90 receives a one volt bias. Thus, when the current in the lead 98 causes the voltage thereon to exceed one volt, the transistor 92 conducts heavily and the conduction of the transistor 90 is substantially reduced. Consequently, the conduction of transistor 77 is correspondingly reduced. The resultant increase in voltage at the collector of transistor 77 turns the transistor 94 on harder but reduces the conduction in the transistor 96. Hence, the current in the lead 98 is reduced as is the voltage thereon. This feedback effect maintains the voltage on the lead 98 at a level of about one volt to permit a fast recovery to normal sync separator operation when a noise pulse terminates. The return to normal operation is restored when the noise pulse moves back more positive than 2.2 volts and transistor 77 turns off. Power is saved because of the reduction in current conducted by the transistor 96.

An important aspect of the operation of the noise processing effected by circuit 22 and of the sync separator stage 50 is accomplished by the NPN-PNP configuration of transistors 94 and 96 along with their associated resistors. A duplicate configuration using the transistors 108 and 110 is found in sync separator stage 50. The behavioral description will be given for the configuration of circuit 22, but this description will also apply to the configuration of transistors 108 and 110.

The illustrated configuration of transistors 94 and 96 allows for an offset in the turn on, along with high speed turn on and turn off of transistor 96. The input capacitance of the base of transistor 96 is used to advantage in its turning on and turning off as described below.

Assuming that the voltage on lead 99 is 12 volts, the base of transistor 94 is at 12 volts and the emitter of transistor 94 is at approximately 11.3 volts. Transistor 94 is then conducting with an emitter current specified by its emitter resistor. The collector current of transistor 94, which is approximately equal to its emitter current, causes approximately a 0.3 volt drop across the resistor connected to node 101. This brings the emitter voltage of transistor 96 to approximately 11.7 volts. The emitter to base voltage drop of transistor 96 is held to approximately 0.4 volts. This voltage drop keeps transistor 96 out of conduction. Any combination of emitter voltage increase or base voltage decrease that amounts to approximately a 0.7 volt drop will bring transistor 96 into conduction.

Consider first a slow decrease in voltage on lead 99. When this voltage decreases to approximately 11.7 volts, the emitter of transistor 94 will decrease to approximately 11 volts, and the base of transistor 96 will also be at approximately 11 volts. Because the emitter voltage of transistor 94 has changed only slightly, there is still about 11.7 volts at node 101 due to its collector current. The voltage drop between node 101 and the base of transistor 96 is now approximately 0.7 volts, wherefore transistor 96 begins to conduct. It can be seen that the offset in input voltage of about 0.3 volts is needed to cause transistor 96 to conduct. With a further slow decrease in input voltage at lead 99, transistor 96 will conduct more heavily. Slowly increasing the voltage on the lead 99 will take transistor 96 out of conduction in the reverse manner. The sync separator stage 50 also makes use of this offset or dead zone.

When a faster decrease from the 12 volt level at the input lead 99 occurs, a somewhat different action takes place. As the voltage on lead 99 decreases, the voltage at the emitter of transistor 94 begins to decrease, bringing the base of transistor 96 down with it. The emitter of transistor 94 now sees the base input capacitance of transistor 96, and the emitter current of transistor 94 decreases rapidly in an attempt to discharge this capacitance. This rapid decrease in emitter current of transistor 94 causes a rapid decrease in its collector current which causes the voltage at node 101 to increase rapidly. This increase in voltage at node 101, along with the decrease in voltage on the base of transistor 96, causes conduction of transistor 96 on or before the input has decreased to 11.7 volts. Further reduction in input voltage sustains and increases the conduction of transistor 96.

A rapid cut-off of transistor 96 takes place with a fast increase in the voltage on the input lead 99. As the base of transistor 94 rises, so does its emitter and the base voltage of transistor 96. Now, however, the current in the emitter of transistor 94 also increases rapidly due to the need to charge the base capacitance of transistor 96. This increase in emitter current in transistor 94 causes a large increase in collector current of transistor 94 and a large drop in voltage at node 101. These rapid changes cause the emitter to base voltage of transistor 96 to drop quickly to less than 0.7 volts and take that transistor out of saturation and out of conduction. This cut-off condition can occur below or at the offset input voltage. Further increases in input voltage will maintain the cut-off condition.

Referring now to the sync separator 50, it includes the transistor 51 whose base is coupled to lead 48 and whose emitter is coupled to the resistance-capacitance network 52. The collector of the transistor 51 is coupled to an output network comprising a pair of diodes 104 and transistors 108, 110 and 112. The operation of transistors 108 and 110 is similar to the previously described operation of transistors 94 and 96.

The diodes 104 are coupled as shown to the collector of transistor 51 to prevent that transistor from saturating when it turns on hard in response to a sync tip. Such conduction of transistor 51 lowers the voltage at its collector (node 114) and causes transistor 110 to conduct heavily. Thus, a positive-going sync pulse is developed at the collector lead 116 of the transistor 110. The lead 116 is coupled to transistor 112 which functions as an output buffer for coupling positive going sync pulses to the lead 54. The latter lead couples those sync pulses to the receiver's horizontal and vertical timing circuits, and the lead 56 couples the same pulses to the circuitry shown in FIG. 9 via leads C and C'.

As mentioned previously, the circuit composed of transistors 108 and 110 rejects slow, low amplitude voltage changes at the input to the base of transistor 108. Thus, video or non-sync information which may inadvertently render the transistor 51 somewhat conductive is prohibited from being transformed into a pulse output at the lead 54.

For proper high speed operation, it is also desirable that the transistor 110 not be driven into hard saturation. The resistor connected to the emitter of transistor 110 and to the collector of transistor 108 limits the saturation current to a safe value.

Referring now to FIG. 9, the AGC comparator 62 is shown as including transistors 118 and 120 which are interconnected as a differential amplifier. Their emitters are coupled via a lead 122 to a circuit which includes transistors 124, 126, 128 and 130. The collector of the transistor 120 is coupled via a lead 132 to a current mirroring network which includes transistors 134, 136 and 138. The emitter of the transistor 138 is coupled to the collector of transistor 126 and to the AGC filter 66, the latter being shown as a capacitor 140.

To activate the comparator 62, the base of the transistor 128 must receive a horizontal strobe, and the base of the transistor 130 must receive either a sync pulse via the lead C' from the sync separator or a signal via the lead 74 from the anti-lockout network 70. The lead 74 and the lead C' are both coupled to a node 142 which couples to the base of the transistor 130. This "wired OR" arrangement serves the purpose of the OR gate 58 shown in FIG. 1. The function of the AND gate 60 (FIG. 1) is provided in FIG. 9 by virtue of the fact that the transistor 130 and the transistor 128 must be turned on simultaneously in order to activate the AGC comparator 62.

Assuming now that the transistor 128 has received a horizontal strobe, it will turn on to provide a current path to the transistors 124 and 126. If a sync pulse is simultaneously received via the lead C', the transistor 130 conducts, and the transistor 124 mirrors an amplified current to the emitters of transistors 118 and 120. The transistor 126 mirrors a similar amplified current $I_1$ to node 144.

Assuming that the video signal which is received by the base of the transistor 118 has a sync tip level equal to four volts, the transistors 118 and 120 will conduct evenly. The resultant current in lead 132 is mirrored by the transistors 134, 136 and 138 as a current $I_2$ toward the node 144. Normally, the currents $I_1$ and $I_2$ are of equal value when the transistors 118 and 120 conduct equally. Thus, there will be no extra current into or out of capacitor 140 and the capacitor 140 will retain its previous voltage and level of charge. However, when the sync tips deviate from four volts, the current $I_2$ changes to cause a corresponding change in charge on the capacitor 140, thereby developing a changing AGC voltage for varying the gain of either the IF amplifier or the turner (or both) depending on the level of the received RF television signal. This gain change will bring the sync tip back to the 4 volt level and cause $I_2$ to be again equal to $I_1$ with a new voltage and level of charge on capacitor 140.

Referring now to the anti-lockout circuit 70 shown in FIG. 9, that circuit receives an input via the lead B' for sensing the voltage on the capacitors in network 52. As mentioned previously, the voltage on those capacitors decreases substantially when the sync separator has undergone an interval during which it has developed no output sync pulses. To sense the voltage on the capacitors in network 52, the latter network is coupled via the leads B and B' to the base of the transistor 146. The emitter of transistor 146 is coupled to the base of another transistor 148. The emitter of the latter transistor is coupled to a transistor 150 which is normally conductive by virtue of the bias applied to its base. That bias is developed by the current from transistor 102 which flows through the resistor 152.

When the voltage on lead B' declines sufficiently, the transistor 148 turns on to inject a larger than normal current into the node 142. Hence, when the next horizontal strobe is received by the transistor 128, the collector current $I_1$ of transistor 126 increases. The current $I_2$ may also vary, depending on the difference between the four volt reference received by the transistor 120 and the sync tip level received by the transistor 118. Thus, the AGC voltage on the capacitor 140 is varied to alter the gain of the tuner and/or the IF amplifier.

The foregoing description has shown how the noise processing system affects and interfaces with the receiver's sync processing path. To explain that portion of the noise processing system which affects the video processing path, reference is again made to FIG. 8.

It will be recalled that the transistor 80 was turned on each time a noise pulse exceeded the video noise threshold. The collector current of this transistor is in the form of a current pulse which actuates the video switch 32.

The switch 32 includes transistors 154, 156, 158, 160, 162 and 164. The transistor 162 receives the composite video at its base and, in the absence of impulse noise, couples the video to the transistor 164 for output to the video processing path.

When a noise pulse exceeds the video noise threshold, the collector current developed by the transistor 80 is amplified by a current mirror formed by the transistors 154 and 156, thereby raising the voltage at the emitter of transistor 158 (node 166) and turning that transistor on.

The base of transistor 158 is coupled to a voltage divider comprising resistors 168, 170 and 172. The junction between resistors 170 and 172 is coupled via another resistor 174 to the collector of a transistor 176. The base of the latter transistor is coupled to a horizontal strobe for turning that transistor on during the receiver's blanking interval. When that interval occurs, the transistor 176 saturates to shunt the resistor 172 with the resistor 174, thereby lowering the voltage at the base of transistor 158 to a level which causes a blank level voltage to appear on node 166. The transistor 160 then conducts to turn off the transistor 162 and to cause the transistor 164 to output a blank level voltage to the video processing path.

When transistor 80 conducts anytime except during the receiver's blanking interval, the transistor 158 is turned on and the transistor 176 remains off. For this condition, the resistors 168, 170 and 172 are selected to develop a voltage at the base of the transistor 158 which causes a gray level voltage to appear at node 166. The gray level voltage is coupled via transistors 160 and 164 to the video output and the transistor 162 is turned off.

The noise processing system described above has been found to provide fast and reliable noise processing. Video images are improved in noisy signal conditions, and the sync processing path is highly desensitized to large noise pulses. Even the high energy, black-going noise pulses developed by conventional envelope detectors are inhibited from severely upsetting the receiver's AGC and synchronization systems. Of course, the present noise processing system is also useful in receivers employing a synchronous detector.

Although the invention has been described in terms of preferred structure, it will be obvious to those skilled in the art that many modifications and alterations may be made thereto without departing from the invention. Accordingly, all such modifications and alterations are intended to be considered as within the spirit and scope of the invention as defined by the appended claims.

What is claimed is:

1. In a television receiver which detects a composite video signal having a blank level and a gray level, and which includes a path for processing sync information derived from the composite video signal and another path for processing video information derived from the composite video signal, a noise processing system for reducing impulse noise in the sync processing path and in the video processing path, comprising:

a first impulse detector receiving the composite video signal for detecting noise pulses therein which extend beyond a selected video noise threshold and for generating a control signal upon the occurrence of each such detection;

first noise cancelling means receiving the control signal and the composite video signal for inserting into the video signal in response to the control signal a selected voltage level corresponding to a gray level during the receiver's active scan time and a different selected voltage level during the receiver's blanking interval so as to replace impulse noise with the selected voltage levels and thereby generate a noise-processed video signal for application to the video processing path;

a second impulse detector receiving the composite video signal for detecting noise pulses therein extending beyond a selected sync noise threshold and for generating a detection pulse representative of each detected noise impulse; and second noise cancelling means receiving the composite video signal and the detection pulses for substantially cancelling from the video signal noise pulses which are substantially time coincident with the detection pulses to thereby develop another noise-processed video signal for application to the sync processing path.

2. A noise processing system as set forth in claim 1 wherein said different voltage level corresponds to the blank level.

3. A noise processing system as set forth in claim 1 wherein said first noise cancelling means includes:

first switch means receiving a gray level signal and a different level signal, responsive to the receiver being in a blanking interval for outputting the different level signal, and responsive to the receiver being in a non-blanking interval for outputting the gray level signal; and second switch means receiving the composite video signal and the output of said first switch means, and being responsive to said control signal for replacing noise pulses in the composite video signal with the output of said first switch means.

4. A noise processing system as set forth in claim 3 wherein said different level signal corresponds to the blank level.

5. A noise processing system as set forth in claim 1 wherein the composite video signal includes sync tips, wherein the video noise threshold is selected to be more black than the sync tip level, and wherein the sync noise threshold is selected to be substantially more black than the video noise threshold.

6. A noise processor as set forth in claim 1 wherein said second noise cancelling means includes:

a pulse reversing circuit adapted to receive and invert the detection pulses;

an amplifier receiving the composite video signal for amplifying and integrating the latter signal, and receiving the inverted detection pulses for combining them with the amplified and integrated composite video signal so as to cancel noise pulses in the composite video signal; and means sensing the amplitude of said detection pulses and coupled to said pulse reversing circuit in a feedback arrangement so as to limit the amplitude of the detection pulses to a reference level so as to enable the pulse reversing circuit to quickly recover from its response to a received detection pulse.

7. In a television receiver which detects a composite video signal having a blank level and a gray level, and which includes a path for processing sync information derived from the composite video signal and another path for processing video information derived from the composite video signal, a noise processing system for reducing impulse noise in the sync processing path and in the video processing path, comprising:

a first impulse detector receiving the composite video signal for detecting noise pulses which extend beyond a selected video noise threshold and for generating a control signal upon the occurrence of each such detection;

first switch means receiving a gray level signal and a blank level signal, responsive to the receiver being in a blanking interval for outputting the blank level signal, and responsive to the receiver being in a non-blanking interval for outputting the gray level signal;

second switch means receiving the composite video signal and the output of said first switch means, and being responsive to said control signal for replacing noise pulses in the composite video signal with the output of said first switch means, thereby generating a noise-processed video signal for application to the video processing path; and means receiving the composite video signal for eliminating therefrom noise pulses which exceed a selected sync noise threshold so as to generate another noise-processed video signal for application to the sync processing path.

8. In a television receiver which detects a composite video signal having a blank level and a gray level and which includes a path for processing video information derived from the composite video signal, a noise processing system for reducing impulse noise in the video processing path, comprising:

an impulse detector receiving the composite video signal for detecting noise pulses therein which extend beyond a selected video noise threshold and for generating a control signal upon the occurrence of each such detection; and noise cancelling means receiving the control signal and the composite video signal for inserting into the video signal in response to the control signal a selected voltage level corresponding to a gray level during the receiver's active scan time and a different selected voltage during the receiver's blanking interval so as to replace impulse noise with the selected voltage levels and thereby generate a noise-processed video signal for application to the video processing path.

9. A noise processing system as set forth in claim 8 wherein said different voltage level corresponds to the blank level.

10. In a television receiver which detects a composite video signal having a blank level and a gray level, and which includes a path for processing video information derived from the composite video signal, a noise processing system for reducing impulse noise in the video processing path, comprising:

an impulse detector receiving the composite video signal for detecting noise pulses which extend beyond a selected video noise threshold and for generating a control signal upon the occurrence of each such detection;

first switch means receiving a gray level signal and a blank level signal, responsive to the receiver being in a blanking interval for outputting the blank level signal, and responsive to the receiver being in a non-blanking interval for outputting the gray level signal; and second switch means receiving the composite video signal and the output of said first switch means, and being responsive to said control signal for replacing noise pulses in the composite video signal with the output of said first switch means, thereby generating a noise-processed video signal for application to the video processing path.

* * * * *